No. 642,836. Patented Feb. 6, 1900.
JOSEPH BRAUN & JOHN BRAUN.
STOP DEVICE OR BUMPER ATTACHMENT FOR SAWING MACHINES.
(Application filed Aug. 30, 1899.)
(No Model.)

Witnesses
Joseph Braun, and
John Braun,
Inventors,
by John B. Thomas & Co.,
Attorneys.

UNITED STATES PATENT OFFICE.

JOSEPH BRAUN AND JOHN BRAUN, OF ATHENS, WISCONSIN.

STOP DEVICE OR BUMPER ATTACHMENT FOR SAWING-MACHINES.

SPECIFICATION forming part of Letters Patent No. 642,836, dated February 6, 1900.

Application filed August 30, 1899. Serial No. 728,995. (No model.)

*To all whom it may concern:*

Be it known that we, JOSEPH BRAUN and JOHN BRAUN, citizens of the United States, residing at Athens, in the county of Marathon and State of Wisconsin, have invented a Stop Device or Bumper Attachment for Sawing-Machines, of which the following is a specification.

The object of this invention is to provide certain improved stop devices for the reciprocating carriage of a sawing-machine, being more especially adapted for application to that type of stave-sawing machines known as the "Baxter D. Whitney."

The invention contemplates the provision of yielding stop devices or bumpers, which are located at each end of the bed or track for the reciprocating carriage and receive the impact of said carriage at the limit of its movement in either direction, to thereby relieve it of the sudden jar and consequent racking occasioned by contact with a rigid stop. The invention is intended, therefore, to reduce the wear and tear upon the carriage by providing peculiar stop devices, said devices being readily and conveniently applied to a sawing-machine without requiring any alteration thereof.

With the above objects in view the invention consists of pivoted uprights normally brought against the ends of the machine by connecting-rods and an interposed helical spring, together with bolts or rods slidable in supports and adapted to contact with the yielding uprights and to receive the impact of the carriage, said devices being in combination with the reciprocating carriage and frame of the sawing-machine, all as hereinafter fully described, and specifically set forth in the appended claims.

Figure 1:
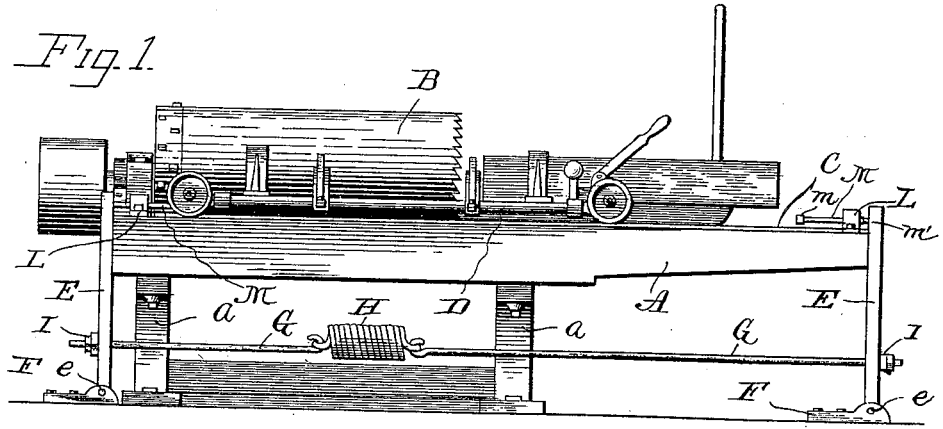
Figure 2:
Figure 3:
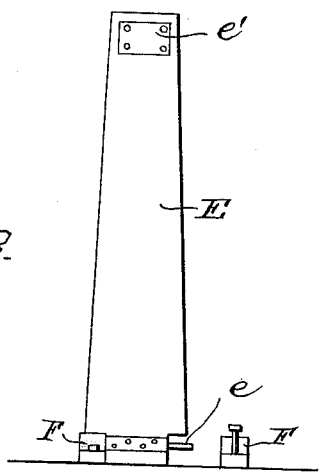

In the accompanying drawings, which form a part of this specification, and wherein like letters of reference indicate similar parts throughout the several views, Figure 1 is a side elevation showing the application of the invention to a stave-sawing machine. Fig. 2 is an enlarged view of the support for the sliding bolt. Fig. 3 is an elevation of one of the uprights.

In the drawings, we have shown the invention applied to a cylindrical stave-sawing machine, A designating the frame of the machine, which is supported upon legs $a$ and supports the cylindrical saw B, and to one side of said saw is arranged a longitudinal track C, upon which moves a carriage D, the latter carrying the material to the saw, and is therefore adapted to be reciprocated back and forth upon the frame of the machine, rolling upon the track C, which extends the full length of the frame, as shown. We do not lay any claim to the sawing-machine or parts just referred to and will not, therefore, enter into a detail description of said parts, for they are illustrated herein merely to show the application of the invention.

In carrying out the invention uprights or boards E E are provided and arranged one at each end of the machine, being pivoted at their lower ends between brackets F, which are so disposed that the uprights or boards when in a vertical position will bear against the opposite ends of the frame A of the sawing-machine. The brackets F are bolted to the floor beneath the sawing-machine and are provided with openings, which receive the gudgeons $e$ at the lower end of the uprights, permitting said uprights to have a swinging movement. The uprights are connected to each other by rods G G and an interposed helical spring H, the spring and rods being connected to each other by bending the ends into hooks, as shown, while the outer ends of the rods are threaded and after being passed through the uprights or boards are attached thereto by nuts I, screwed upon said threaded ends. This manner of connecting the uprights to each other tends to draw said uprights toward each other and against the ends of the sawing-machine, also permitting a yielding movement of the uprights away from the machine, which is utilized in the manner hereinafter described to form a yielding bumper for the carriage D.

L L designate blocks, which are bolted or otherwise attached to the ends of the track or carriage-way of the sawing-machine and form supports for sliding bolts or rods M. Said bolts extend through openings in the blocks, and the heads or enlargements $m$ at their inner end form the part against which the carriage contacts, the opposite end of the bolt being in engagement with the upper end of the upright or board E. The bolts extend inward beyond the blocks a sufficient distance to gently arrest or retard the movement of the carriage before the head of the bolt comes in contact with the rigid stop or block. The inward movement of the bolt imparted by the spring-retracted upright is limited by a nut $m'$ at the outer end of said bolt, and in the event the upright is constructed of wood a metal wear-plate $e'$ is attached thereto, as shown.

In the operation of a sawing-machine provided with our improved attachments the carriage D will be gradually retarded or stopped at the limit of its movement in either direction, for in coming in contact with the head of either bolt M and the sliding movement of said bolt being retarded by the upright with which it is in engagement the carriage will be slowly stopped and relieved of the sudden jar to which it would be subjected were it permitted to strike a rigid stop. The device therefore provides a very effective spring-bumper for the carriage, and the tension of the bumper or resiliency of the same can be increased and diminished by manipulating the nuts I at the ends of the connecting-rods G.

The arrangement of the parts forming the improved stop devices is such that they do not interfere in the operation of the sawing-machine, or, in other words, are so located as to be entirely out of the way.

Though we have shown the devices applied to a stave-sawing machine, it will be obvious that they could be applied to any other style of sawing-machine employing a reciprocating carriage, as they form a very simple and effective stop or spring-bumper to prevent injury to the carriage by relieving it of a sudden jar at the end of its movement in either direction.

Having thus described our invention, what we claim as new, and desire to secure by Letters Patent, is—

1. In a stop device or bumper attachment for sawing-machines, the combination with the frame or track and reciprocating carriage, of blocks at the ends of the track, bolts or rods slidably mounted in said blocks, pivoted uprights with which the bolts are adapted to engage, rods connected to the uprights, and a helical spring to which the rods are connected at their inner ends, the sliding bolts having heads at their inner ends against which the carriage contacts, substantially as shown and for the purpose set forth.

2. In a stop device or bumper attachment for sawing-machines, the combination with the frame or track and reciprocating carriage, of blocks at the ends of the track, bolts slidably mounted in said blocks and provided with nuts at their outer ends, uprights pivoted at their lower ends in brackets and adapted to swing against the ends of the frame of the sawing-machine, threaded connecting-rods attached to the uprights by nuts, and a helical spring the opposite ends of which are bent into engagement with the hooked inner ends of the connecting-rods, substantially as herein shown, and for the purpose set forth.

JOSEPH BRAUN.
JOHN BRAUN.

Witnesses:
ERNST RAMTHUN,
MAT PHILIPPI.